United States Patent Office 2,855,399
Patented Oct. 7, 1958

2,855,399

BIS-(PIPERIDYLMETHYL)-PHENOLS

Robert August Schmidt, Wallington, and Wilhelm Wenner, Upper Montclair, N. J., assignors to Hoffmann-La Roche Inc., Nutley, N. J., a corporation of New Jersey No Drawing. Application July 13, 1955
Serial No. 521,913

6 Claims. (Cl. 260—294.7)

This invention relates to diamines, more particularly, bis-(piperidylmethyl) derivatives of substituted phenols. Still more particularly, the invention relates to bis-(piperidylmethyl)-phenols bearing an alkyl or aralkyl group para to the hydroxy group, and to salts of said compounds. The compounds of this invention may also be referred to as 2,6-bis-(1-piperidylmethyl)-4-alkylphenols, 2,6-bis-(1 - piperidylmethyl) - 4 - aralkylphenols and salts thereof.

The compounds of this invention may be represented by the following structural formula

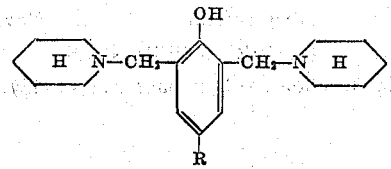

wherein R represents an alkyl or an aralkyl group.

The alkyl groups represented by R in the above structural formula include straight chain and branched chain alkyl groups, such as methyl, ethyl, isopropyl, n-butyl, tertiary butyl, tetramethylbutyl and the like. A preferred group of alkyl radicals represented by R include straight and branched chain radicals having 1 to 8 carbon atoms.

Aralkyl groups represented by R in the above formula are hydrocarbon radicals having a phenyl group attached to a straight or branched chain alkylene group such as benzyl, cumyl and the like. A preferred group of aralkyl radicals include monocyclic aralkyl groups having 7 to 9 carbon atoms. The basic diamines of this invention form acid addition salts with inorganic acids, e. g., mineral acids such as hydrochloric, hydrobromic, hydriodic, sulfuric and phosphoric acids, and organic acids, e. g., oxalic, citric, acetic, lactic, tartaric acids and the like. These salts may be formed by reacting the base with the appropriate acid, preferably in a solvent. Both mono and poly acid addition salts are within the scope of this invention.

A preferred class of salts within the scope of this invention constitutes non-toxic, pharmaceutically acceptable salts formed by the bases with acids conventionally employed in the preparation of therapeutic substances. A most preferred class constitutes acid addition salts formed by the bases represented by the structural formula above and mineral acids.

The compounds of this invention are useful in the treatment of heart disease, i. e., they have quinidine-like activity and may be used as a remedy for auricular fibrillation. The novel compounds may be administered orally according to conventional practice.

The bases corresponding to the structural formula above are synthesized by reacting 4-substituted phenols, i. e., phenols bearing an alkyl or aralkyl group in the 4-position, with two equivalents of formaldehyde and two equivalents of piperidine, preferably in a solvent. The amines thus formed are generally colorless liquids and form crystalline salts with acids. The salts are generally insoluble in ether and easily soluble in water. The acid salts are produced by reacting the base with the appropriate acid.

The following examples are illustrative of this invention but are not limitative thereof. All temperatures are in degrees centigrade.

Example 1

55 g. of 37.8% formaldehyde solution were added gradually with stirring to 32.5 g. of p-cresol and 55 g. of piperidine in 200 cc. of ethanol. The temperature rose from 33° to 43°. The solution was refluxed for 5 hours and the solvent was evaporated at diminished pressure. 2,6-bis-(1-piperidylmethyl)-p-cresol was obtained as a residual oil.

The residual oil obtained above was dissolved in 200 cc. of ether and acidified with 19% ethanolic-HBr. Seeding and dilution with ether gave a gradual deposition of colorless crystals which were filtered and washed with ether. The crystals were again crystallized from ethanol and then from isopropanol. The 2,6-bis-(1-piperidylmethyl)-p-cresol dihydrobromide melted at 236–239°.

Example 2

55 g. of formaldehyde were added dropwise, while mixing, to a solution of 41 g. of p-isopropylphenol and 55 g. of piperidine in 150 cc. of ethanol. The temperature rose from 32° to 52°. The solution was permitted to stand overnight and then refluxed for 5 hours. Evaporation of the solvent at diminished pressure left 2,6-bis-(1-piperidylmethyl)-4-isopropylphenol as an oil.

The oil obtained above was dissolved in ether and acidified with 4 N ethanolic-HCl. The resultant deposit was filtered and washed with ether. The colorless 2,6-bis-(1-piperidylmethyl)-4-isopropylphenol dihydrochloride crystals thus obtained were recrystallized twice from isopropanol and melted at 217–221°.

Example 3

10 g. of formaldehyde were added to a solution of 10 g. of piperidine and 7.5 g. of p-tertiarybutylphenol in 175 cc. of ethanol. The solution stood 9 days at room temperature and was then heated on a steam bath for 6 hours. The solvent was evaporated at diminished pressure with 2,6-bis-(1-piperidylmethyl)-4-tertiarybutylphenol remaining as a residual oil.

The residual oil was dissolved in ether and acidified with 4 N ethanolic-HCl. The colorless 2,6-bis-(1-piperidylmethyl)-4-tertiarybutylphenol dihydrochloride crystals thus obtained were recrystallized twice from isopropanol, M. P. 222–225°.

Example 4

9 g. of formaldehyde were added to a solution of 8.5 g. of piperidine and 9.2 g. of 4-benzylphenol in 125 cc. of ethanol. The solution stood at room temperature for 3 days. The solvent was removed at diminished pressure. 2,6-bis-(1-piperidylmethyl)-4-benzylphenol remained as a residual oil.

The residual oil was dissolved in ether and acidified with 4 N ethanolic-HCl. The precipitated oil solidified slowly. The solid 2,6-bis-(1-piperidylmethyl)-4-benzylphenol dihydrochloride thus obtained was recrystallized first from isopropanol and then from acetone-ethanol-ether, M. P. 211–213°.

Example 5

480 g. of 37.8% formaldehyde solution were added gradually to a solution of 500 g. of piperidine and 615 g. of p-α-cumylphenol in 1300 cc. of ethanol. The temperature rose from 33° to 62°. The solution was then refluxed for 5 hours. The solvent was evaporated at diminished pressure. Water was removed from the residual oil by the addition of two liters of benzene (in two portions) and evaporation of the solvent, leaving 2,6-bis-(1-piperidylmethyl)-4-(α,α-dimethylbenzyl)-phenol as a residual oil.

The residual oil was dissolved in 2.5 liters of ethanol and acidified to pH 3-4 with dry hydrogen bromide. The mixture was filtered and washed with alcohol. The solid 2,6-bis - (1 - piperidyl - methyl) - 4 - (α,α - dimethylbenzyl)-phenol dihydrobromide thus obtained was recrystallized from alcohol to give a colorless crystalline product, M. P. 245–247.5°.

Example 6

51 g. of 4-(1,1,3,3-tetramethylbutyl)-phenol were dissolved in 200 cc. of ethanol. The mixture was stirred and cooled with ice water. 43 g. of piperidine were slowly added followed by the addition of 43 g. of 38% formaldehyde solution. The solution was kept at about 20° for 4 hours and was then refluxed for 2 hours. The solvent was distilled off and the residue was dissolved in dilute hydrochloric acid. The acid solution was extracted with ether and then made alkaline by an excess of ammonia. The base, 4-(1,1,3,3-tetramethylbutyl)-2,6-bis-(1-piperidylmethyl)-phenol, was extracted with ether, dried over potassium carbonate and filtered.

Ethanolic-HBr was added to the base obtained above until the solution was distinctly acid to Congo red paper. Ether was added to the solution until the mixture showed a slight turbidity. On standing, 4-(1,1,3,3-tetramethylbutyl)-2,6-bis-(1-piperidylmethyl)-phenol dihydrobromide crystallized. Upon recrystallization from isopropanol, the 4 - (1,1,3,3 - tetramethylbutyl) - 2,6 - bis - (1 - piperidylmethyl)-phenol dihydrobromide monohydrate melted at 220°.

We claim:
1. A compound selected from the class consisting of bases having the formula

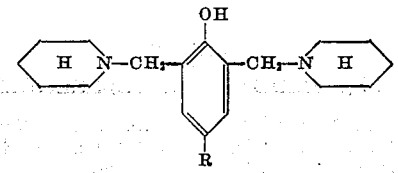

wherein R is a member of the group consisting of alkyl groups having 1 to 8 carbon atoms and aralkyl groups having 7 to 9 carbon atoms and salts of said bases.

2. 2,6 - bis - (1 - piperidylmethyl) - 4 - (α,α - dimethylbenzyl)-phenol.

3. 2,6 - bis - (1 - piperidylmethyl) - 4 - (α,α - dimethylbenzyl)-phenol dihydrobromide.

4. 2,6 - bis - (1 - piperidylmethyl) - 4 - benzylphenol.

5. 2,6 - bis - (1 - piperidylmethyl) - 4 - tertiarybutylphenol.

6. 2,6 - bis - (1 - piperidylmethyl) - 4 - isopropylphenol.

References Cited in the file of this patent
UNITED STATES PATENTS 2,363,134  McCleary _____ Nov. 21, 1944

FOREIGN PATENTS 681,993  Great Britain _____ Nov. 5, 1952

OTHER REFERENCES

Organic Reactions, vol. 1, page 311 (1942).